(12) United States Patent
Bruckner et al.

(10) Patent No.: US 7,139,922 B2
(45) Date of Patent: Nov. 21, 2006

(54) POWERING DOWN A COMPUTER IN RESPONSE TO A THERMAL EVENT

(75) Inventors: Robert O. Bruckner, Wilsonville, OR (US); Paul S. Durley, Portland, OR (US); William L. Sanderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 738 days.

(21) Appl. No.: 09/918,130

(22) Filed: Jul. 30, 2001

(65) Prior Publication Data

US 2003/0070104 A1    Apr. 10, 2003

(51) Int. Cl.
*G06F 1/26* (2006.01)
(52) U.S. Cl. ..................... 713/324; 713/330
(58) Field of Classification Search ............... 713/324, 713/330
See application file for complete search history.

(56) References Cited

U.S. PATENT DOCUMENTS

| | | | | |
|---|---|---|---|---|
| 5,367,697 | A | * | 11/1994 | Barlow et al. ............... 713/330 |
| 5,379,378 | A | * | 1/1995 | Peters et al. ................. 710/105 |
| 5,692,197 | A | * | 11/1997 | Narad et al. ................. 713/323 |
| 5,763,960 | A | * | 6/1998 | Ceccherelli et al. ........... 307/41 |
| 5,784,628 | A | * | 7/1998 | Reneris ........................ 713/300 |
| 6,098,174 | A | * | 8/2000 | Baron et al. ................. 713/300 |
| 6,172,611 | B1 | * | 1/2001 | Hussain et al. .............. 340/584 |
| 6,192,479 | B1 | * | 2/2001 | Ko .............................. 713/300 |
| 6,711,691 | B1 | * | 3/2004 | Howard et al. .............. 713/300 |

* cited by examiner

*Primary Examiner*—Lynne H. Browne
*Assistant Examiner*—Tse Chen
(74) *Attorney, Agent, or Firm*—Trop, Pruner & Hu, P.C.

(57) ABSTRACT

A technique includes receiving an indication of a thermal event in a processor. The processor is part of a computer system. In response to the indication, the processor is powered down, and subsequent to the powering down of the processor, other components of the computer are powered down.

15 Claims, 3 Drawing Sheets

POWERING DOWN A COMPUTER IN RESPONSE TO A THERMAL EVENT

BACKGROUND

The invention generally relates to powering down a computer in response to a thermal event, such as a thermal event that occurs in a central processing unit, for example.

A central processing unit (CPU) of a computer typically includes a temperature sensor for purposes of detecting when the internal temperature of the CPU reaches a level that may damage the CPU, an occurrence called a thermal event. When this thermal event arises, the CPU stops executing instructions and asserts a signal called a thermal trip signal on one of its external terminals to indicate the event. In response to the assertion of the thermal trip signal, the motherboard power supply transitions through a power down sequence to remove power from all power consuming components of the computer, including the CPU.

A conventional way to power down, or turn off, the computer is to introduce a predetermined delay of several seconds. This delay may be the same delay that is experienced when the on/off power switch to the computer is depressed to turn off the computer, i.e., the computer does not turn off until the power switch has been depressed to its off position for the predetermined delay. However, due to the delay in powering down the computer, the CPU may be damaged before power to the CPU is removed.

Thus, there is a continuing need for an arrangement that addresses one or more of the problems that are stated above.

DETAILED DESCRIPTION

Figure 1:
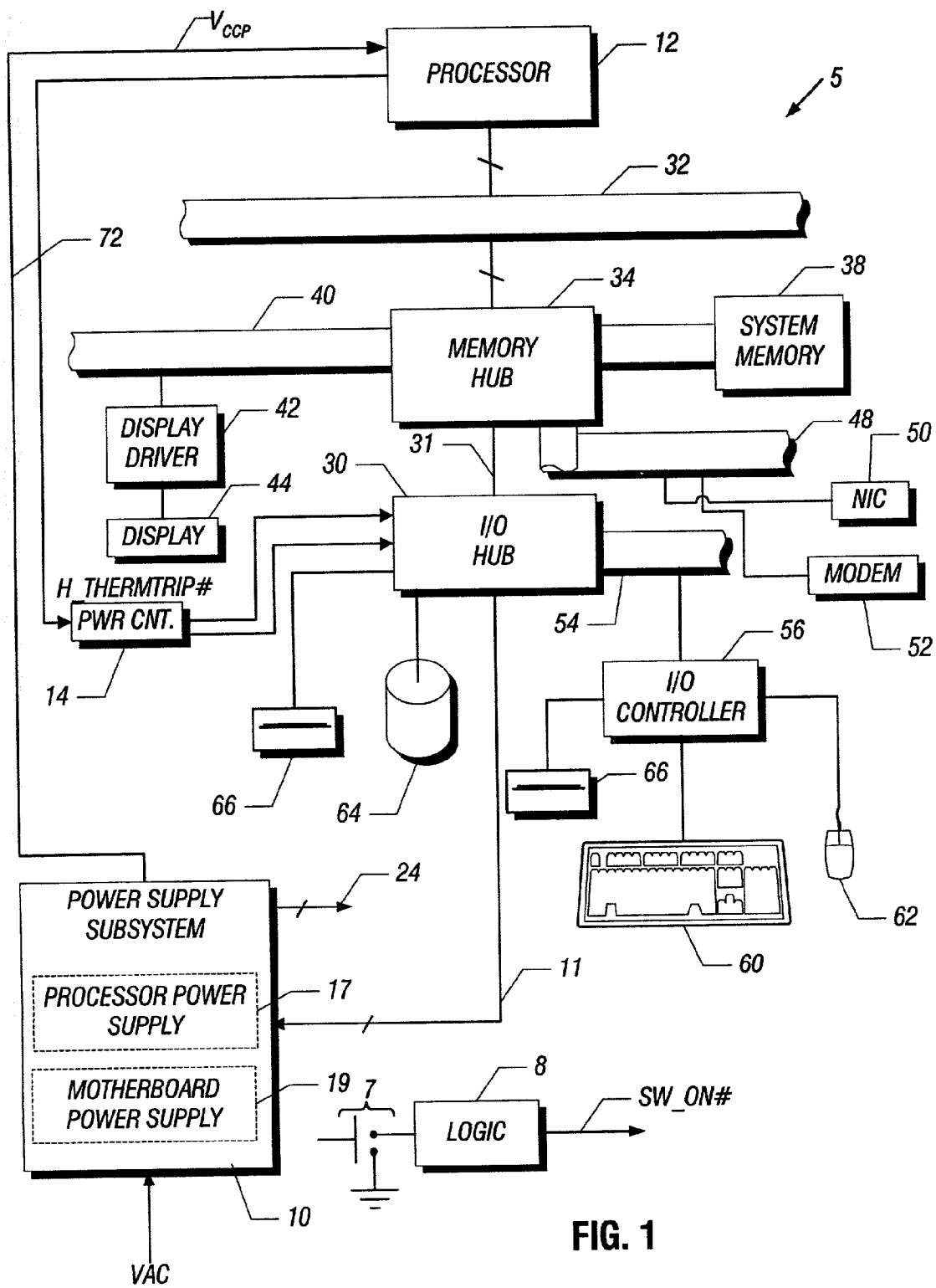
FIG. 1 is a schematic diagram of a computer system according to an embodiment of the invention.

Referring to FIG. 1, an embodiment 5 of a computer system in accordance with the invention includes a processor 12 (a central processing unit (CPU) or microprocessor, as examples) that receives power via a supply voltage (called VCCP) from a supply voltage rail 72. The processor 12 includes a thermal sensor (not shown) for purposes of monitoring the internal temperature of the processor 12. In this manner, when the thermal sensor indicates that the internal temperature of the processor 12 exceeds a predetermined level, a thermal event occurs in that the internal temperature is too high to continue operation of the processor 12. Thus, in response to the detection of the thermal event, the processor 12 stops executing instructions and asserts (drives low, for example) a thermal trip signal called H_THERMTRIP# to indicate the thermal event so that other circuitry (described below) of the computer may respond to the thermal event.

Figure 2:
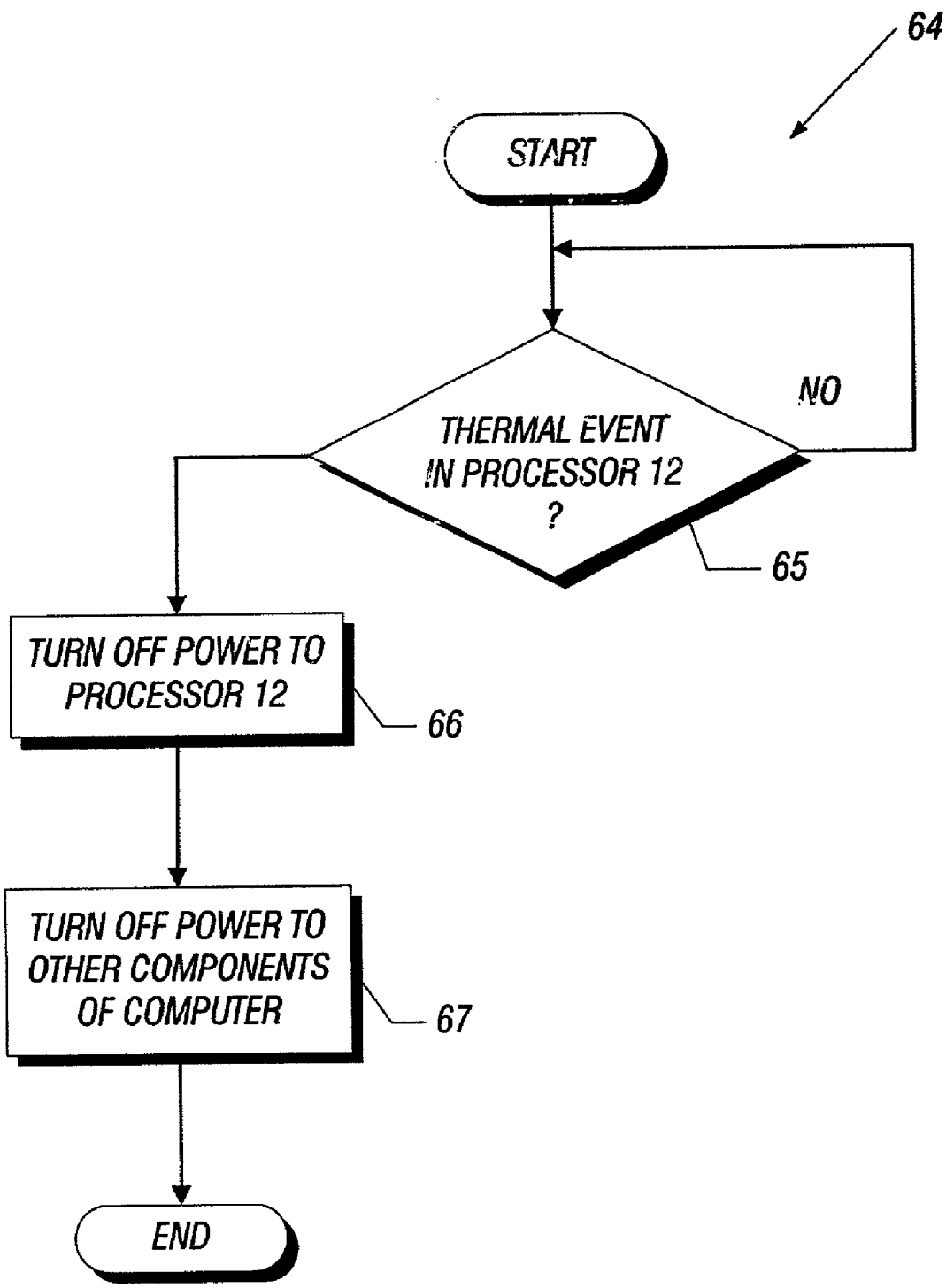
FIG. 2 is a flow diagram depicting a technique to power down the computer system according to an embodiment of the invention.

Unlike conventional computer systems, the computer system 5 performs a technique 64 that is depicted in FIG. 2 to power down the system 5. The power down occurs in response to the determination (diamond 65) that the internal temperature of the processor 12 has exceeded some threshold level, as described above. In response to this determination, the computer system 5 turns off (block 66) power to the processor 12 and then subsequently turns off (block 67) power to the remaining components of the computer system 5.

Referring to FIG. 1, in some embodiments of the invention, turning off, or removing, power to the processor 12 involves cutting off the VCCP supply voltage by turning off a processor power supply 17 that provides the VCCP supply voltage. Turning off, or removing power, to the remaining power consuming components of the computer system 5 involves turning off a motherboard power supply 19 (which may represent multiple power supplies), a supply that provides power (via supply lines 24) to these components. Although the processor 12 may reside on the motherboard of the computer system 5, the power to the processor 12 is not provided by the motherboard power supply 19, for reasons that are described below. The processor 17 and motherboard 19 power supplies are part of a power supply subsystem 10 of the computer system 5.

Powering down the motherboard power supply 19, in some embodiments of the invention, involves introducing a delay of several (four, for example) seconds. This is due to the use of a signal (called SW_ON#) to power down the motherboard power supply 19. In this manner, referring to FIG. 1, the state of the SW_ON# signal generally indicates the state of indicative of a user controlled, mechanically activated on/off switch 7 of the computer 5. Thus, as an example, the computer system 5 may include logic 8 that senses the state of the switch 7 and generates the SW_ON# signal accordingly. In some embodiments of the invention, a logic one voltage for the SW_ON# signal indicates that the switch 7 is in the on position (to turn the computer 5 on), and a logic zero voltage for the switch 7 indicates that the switch 7 is in the off position (to turn the computer system 5 off).

The computer system 5 may not turn off the motherboard power supply 19 until the switch 7 is held in the off position for a predetermined amount of time (four seconds, for example). As a result, the computer system 5 may not power down the power consuming components other than the processor 12 until the SW_ON# signal is in the logic zero state for the same predetermined amount of time. Therefore, because the computer system 5 may wait for the SW_ON# signal to be driven low for the predetermined time interval, using the SW_ON# signal to power down the processor 12 in response to a thermal event, may damage the processor 12. Thus, unlike conventional systems, the routing of power to the processor 12 is controlled independently from the routing of power to the other power consuming components of the computer system 5.

For purposes of controlling the powering down of the computer system 5 in response to a thermal event in the processor 12, the system 5 may include a power control circuit 14. The power control circuit 14 receives the H_THERMTRIP# signal and provides the SW_ON# signal and one other signal (called VCCP_THERM_EN) to control the powering down of the motherboard 19 and processor 17 power supplies, respectively.

In this manner, the SW_ON# and VCCP_THERM_EN signals are received by a south bridge, or input/output (I/O) hub 30 (of the computer system 5), that controls the power supply subsystem 10 (via control lines 11) according to the states of the SW_ON# and VCCP_THERM_EN signals. Thus, in this manner, in response to the H_THERMTRIP# signal being asserted (driven low, for example), the I/O hub 30 communicates with the power supply subsystem 10 to immediately power off the processor 12 by turning off the processor power supply 17 to cut off the VCCP supply voltage. In response to the SW_ON# signal being driven low by the power control circuit 14 for the predetermined delay interval, the I/O hub 30 communicates with the power supply subsystem 10 to turn off the motherboard power supply 19 to power down the remaining power consuming components of the computer system 5. As discussed below, the power control circuit 14, in some embodiments of the invention, concurrently drives the SW_ON# and VCCD_THERMAL signals low (to initiate the powering down of both the processor 17 and motherboard 19 power supplies) in response to the assertion of the H_THERMTRIP# signal. However, although the I/O hub 30, in response, turns off the processor power supply 17 immediately, the I/O hub 30 delays powering off the remaining power consuming components of the computer system 5 until the SW_ON# signal has been driven low for the predetermined delay interval, as described above.

Figure 3:
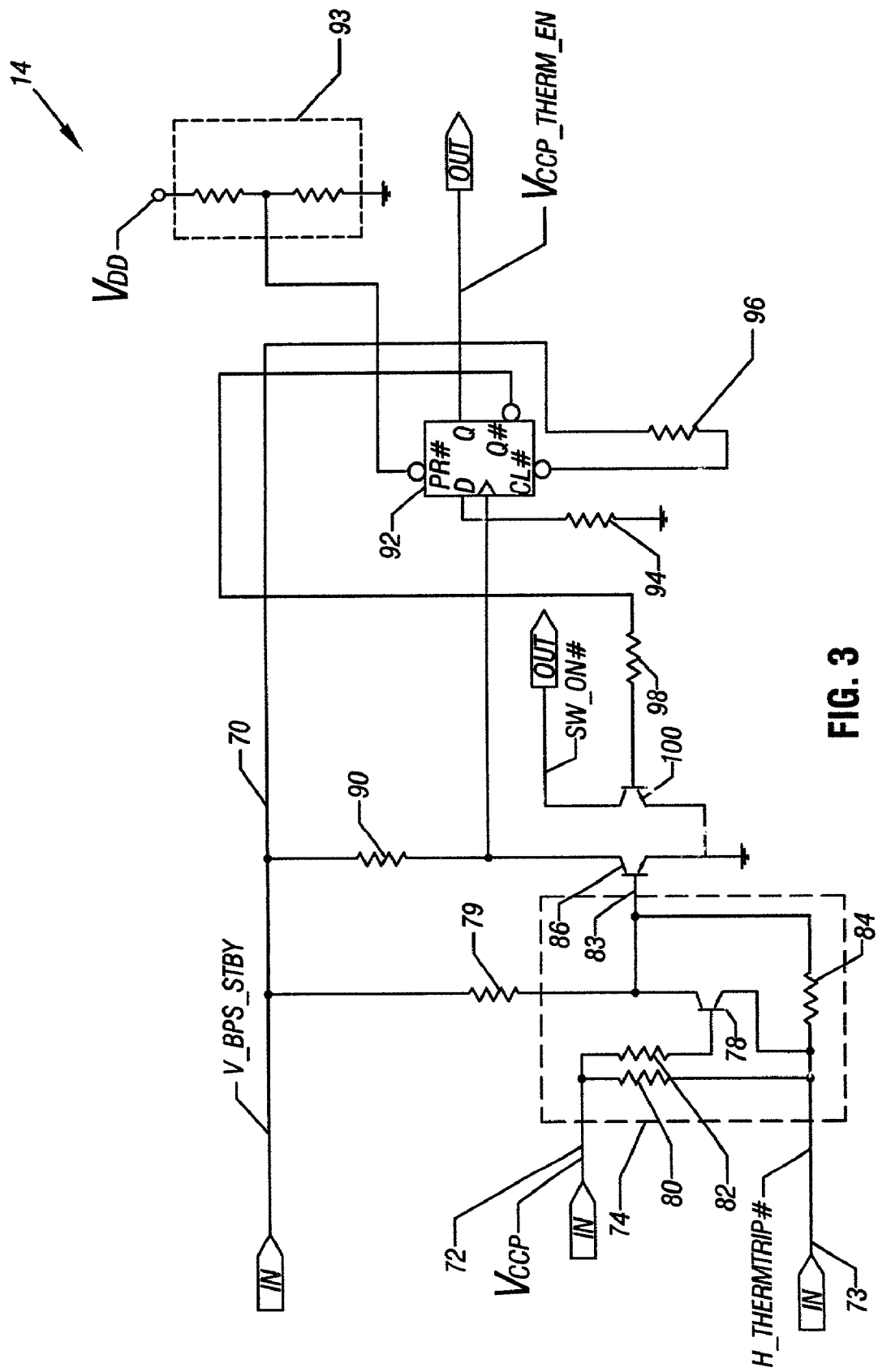
FIG. 3 is a schematic diagram of a power control circuit according to an embodiment of the invention.

Referring to FIG. 3, in some embodiments of the invention, the power control circuit 14 includes a level translator 74 that receives the H_THERMTRIP# signal (at an input terminal 73) and forms a signal (at an output node 83 of the level translator 74) that has a higher logic one level (3.3 volts, for example) than the logic one level (1.7 volts, as an example) of the H_THERMTRIP# signal.

The level translator 74 includes a bipolar junction transistor (BJT) 78 that is configured to not conduct until the H_THERMTRIP# signal is asserted (driven low, for example), as described below. In this manner, as described below, beginning with powerup of the computer system 5, the BJT 78 does not conduct, a state of the BJT 78 that keeps the VCCP THERM_EN signal deasserted (at a logic zero voltage, for example).

More particularly, the collector terminal of the BJT 78 forms the node 83, a node that provides a logic one voltage when the BJT 78 does not conduct. This logic one voltage at the node 83, in turn, is inverted by another BJT 86 to produce a logic zero voltage at the clock terminal of a D-type flip-flop 92. The flip-flop 92, in turn, provides the VCCP THERM_EN signal at its non-inverting output terminal, receives a constant logic zero voltage at its input terminal and sets the VCCP_THERM_EN signal to a logic one value upon powerup of the computer system 5. As long as the BJT 78 does not conduct, the signal at the clock input terminal of the flip-flop 92 does not transition from the logic zero state.

However, in response to the assertion of the H_THERMTRIP# signal, the BJT 78 conducts to pull its collector terminal low, and thus, the node 83 transitions to a logic zero voltage, thereby causing the voltage at the clock terminal of the flip-flop 92 to transition to a logic one voltage. This transition, in turn, effectively causes a positive going clock edge to occur at the clock terminal to cause the flip-flop 92 to latch its input signal (i.e., a logic zero voltage) to change the state of the VCCP_THERM_EN signal to a logic zero voltage.

The SW_ON# signal is produced from a signal that appears at the inverted output terminal of the flip-flop 92. In this manner, the SW_ON# signal is provided by the collector terminal of a BJT 100 that inverts the signal present at the inverting output terminal of the flip-flop 92. Thus, logically, the SW_ON# signal follows the VCCP_THERM_EN signal.

Turning now to the specific structure of the power control circuit 14, in some embodiments of the invention, the circuit 14 includes a resistor 79 that is coupled between the node 83 and a positive supply voltage rail 70 that furnishes a supply voltage called V_BPS_STBY. A resistor 82 is coupled between the VCCP supply voltage and the base terminal of the BJT 78, and a resistor 80 is coupled between a supply voltage rail 72 that furnishes the VCCP supply voltage and the emitter terminal of the BJT 78. A resistor 84 is coupled between the input terminal 73 (that receives the H_THERMTRIP# signal) and the node 83. Due to this arrangement, when the VCCP supply voltage is brought up during the powerup of the computer system 5, the emitter and base terminals have the same voltage, and thus, the BJT 78 does not conduct during this transient time, thereby preventing the inadvertent indication of a thermal event by the power control circuit 14.

However, when the H_THERMTRIP# signal is asserted in response to a thermal event in the processor 12, the emitter terminal of the BJT 78 is grounded to cause the BJT 78 to conduct current through its collector-emitter path. This conduction, in turn, pulls the voltage of the node 83 (i.e., the voltage of the BJT's collector terminal) low.

The BJT 86 is configured to be an inverter. In this manner, a resistor 90 is coupled between the V_BPS_STBY supply voltage and the collector terminal of the BJT 86. The collector terminal of the BJT 86 is also coupled to the clock input terminal of the flip-flop 92, and the emitter terminal of the BJT 86 is coupled to ground. Therefore, when the H_THERMTRIP# signal is deasserted (driven high, for example), the node 83 has a logic one voltage, and in response to this voltage, the BJT 86 conducts so that the collector terminal of the BJT 84 pulls the clock terminal of the flip-flop 92 to ground. However, when the H_THERMTRIP# signal is asserted (driven to a logic zero voltage level, for example) the node 83 has a logic zero voltage that, in turn, causes the BJT 86 to no longer conduct and allow the resistor 90 to pull the voltage on the clock terminal of the flip-flop 92 to a logic one level.

The signal input terminal of the flip-flop 92 is coupled to ground, and the inverting asynchronous preset terminal of the flip-flop 92 is coupled to a reference voltage that is formed from a resistor divider 93 that is coupled to a supply voltage called VDD. The inverting asynchronous reset terminal of the flip-flop 92 is coupled to the V_BPS_STBY supply voltage through a resistor 96. At power up, both the preset and reset terminals of the flip-flop 92 are grounded. However, the VDD supply voltage comes up after the V_BPS_STBY supply voltage. Therefore, after powerup of the computer system 5, the flipflop 92 is preset to "1", and thus, VCCP_THERM_EN signal is set to a logic one voltage. As discussed above, in response to the H_THERMTRIP# signal being asserted (driven low, for example), a positive going clock edge occurs, and the flip-flop 92 latches the logic one voltage at its input terminal to change the state of the VCCP_THERM EN signal to a logic zero voltage.

A resistor 98 is coupled between the base terminal of the BJT 100 and the inverted output terminal of the flip-flop 92. The emitter terminal of the BJT 100 is coupled to ground, and the collector terminal of the BJT 100 provides the SW ON# signal. The collector terminal of the BJT 100 is pulled to a logic one voltage when the BJT 100 does not conduct by a pullup resistor (not shown).

Referring back to FIG. 1, among the other features of the computer system 5, the processor 12 may be coupled to a local bus 32 along with a north bridge, or memory hub 34. The memory hub 34 may represent a collection of semiconductor devices, or a "chip set," and provide interfaces to a Peripheral Component Interconnect (PCI) bus 48 and an Accelerated Graphics Port (AGP) bus 40. The PCI Specification is available from The PCI Special Interest Group, Portland, Oreg. 97214. The AGP is described in detail in the Accelerated Graphics Port Interface Specification, Revision 1.0, published on Jul. 31, 1996, by Intel Corporation of Santa Clara, Calif.

A display driver 42 may be coupled to the AGP bus 40 and provide signals to drive a display 44. The PCI bus 48 may be coupled to a network interface card (NIC) 50 and a modem 52, as examples. The memory hub 34 may also provide an interface to a memory bus 36 that is coupled to a system memory 38.

The I/O hub 30 is coupled to the memory hub 34 via a hub link 31. The I/O hub 30 represents a collection of semiconductor devices, or a chip set, and provides interfaces for a hard disk drive 64, a CD-ROM drive 66 and an I/O expansion bus 54, as just a few examples. An I/O controller 56 may be coupled to the I/O expansion bus 54 to receive input data from a mouse 62 and a keyboard 60. The I/O controller 56 may also control operations of a floppy disk drive 58.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
    receiving an indication of a thermal event in a processor, the processor being part of a computer system;
    in response to the indication of the thermal event, controlling a signal associated with a mechanical power switch of the computer system to cause circuitry of the computer system to shut down the computer system in response to the signal indicating that the switch has been held in an off position for a predetermined delay; and
    in response to the thermal event, powering down the processor before the signal indicates the switch has been held in the off position for the predetermined delay.

2. The method of claim 1, wherein components of the computer system other than the processor are powered down after the signal indicates the switch has been in the off position for the predetermined delay.

3. The method of claim 2, further comprising:
    wherein said other components are located on a motherboard of the computer system.

4. The method of claim 1, wherein said powering down the processor comprises:
    cutting off a supply voltage to the processor.

5. The method of claim 2, wherein said powering down other components comprises:
    cutting off at least one supply voltage to said other components.

6. A computer system comprising:
    a processor capable of indicating a thermal event;
    a mechanical switch, the switch being associated with a signal indicative of whether the switch has been held in an off position for a predetermined delay;
    power consuming components;
    a power supply subsystem to supply power to the processor and power consuming components; and
    a circuit to:
        in response to the indication of the thermal event, power down the processor before the signal indicates the switch has been in the off position for the predetermined delay, and
        power down the power consuming components in response to the signal.

7. The computer system of claim 6, wherein said power consuming components are located on a motherboard of the computer system.

8. The computer system of claim 6, wherein the computer system introduces a delay in powering down said power consuming components.

9. The computer system of claim 6, wherein the power supply subsystem powers down the processor by cutting off a supply voltage to the processor.

10. The computer system of claim 6, wherein the power supply subsystem powers down the power consuming components by cutting off at least one supply voltage to said power consuming components.

11. A method comprising:
    receiving an indication of a thermal event in a processor, the processor being part of a computer system;
    in response to the indication, introducing a delay;
    determining whether a mechanical power switch has been in an off position for the duration of the delay;
    in response to the indication, powering down the processor before the expiration of the delay; and
    powering down other components of the computer in response to the expiration of the delay.

12. The method of claim 11, wherein said other components are located on a motherboard of the computer system.

13. The method of claim 11, wherein said powering down other components comprises:
    controlling a state of a signal indicative of a mechanical power switch of the computer system.

14. The method of claim 11, wherein said powering down the processor comprises:
    cutting off a supply voltage to the processor.

15. The method of claim 11, wherein said powering down other components comprises:
    cutting off at least one supply voltage to said other components.

* * * * *